(12) United States Patent
Bayles et al.

(10) Patent No.: US 8,725,815 B2
(45) Date of Patent: May 13, 2014

(54) TRANSMITTING MESSAGES BETWEEN INTERNATIONALIZED EMAIL SYSTEMS AND NON-INTERNATIONALIZED EMAIL SYSTEMS

(75) Inventors: Len Albert Bayles, Sandy, UT (US); Ernest Dainow, Toronto (CA); James M. Galvin, Sykesville, MD (US); Alexander Reidiboim, Toronto (CA); David Wu, Toronto (CA); Joseph Chiu Kit Yee, Toronto (CA)

(73) Assignee: Afilias Limited, Dublin (IE)

( * ) Notice: Subject to any disclaimer, the term of this patent is extended or adjusted under 35 U.S.C. 154(b) by 427 days.

(21) Appl. No.: 13/075,898

(22) Filed: Mar. 30, 2011

(65) Prior Publication Data

US 2012/0254317 A1   Oct. 4, 2012

(51) Int. Cl.
*G06F 15/16* (2006.01)
(52) U.S. Cl.
USPC .......................... 709/206; 709/219; 709/246
(58) Field of Classification Search
USPC ........................................ 709/206, 219, 246
See application file for complete search history.

(56) References Cited

U.S. PATENT DOCUMENTS 6,314,469 B1* 11/2001 Tan et al. ................. 709/245
2002/0120689 A1* 8/2002 Kang et al. ............... 709/206

* cited by examiner

*Primary Examiner* — Ranodhi Serrao
(74) *Attorney, Agent, or Firm* — Blakely, Sokoloff, Taylor & Zafman, LLP

(57) ABSTRACT

A method is provided for transmitting an email message from a sender to a recipient, the recipient capable of receiving email messages compliant with American Standard Code for Information Interchange (ASCII). However, one or more of the sender or other recipients have a non-ASCII email address. Accordingly, mapped ASCII email addresses are created for each of the non-ASCII email addresses. A username is generated as a mapping of the non-ASCII email address using a predefined mapping algorithm. A domain name is selected from one or more predefined domain names. The username is concatenated with the domain name to create the mapped ASCII email address. Then, the non-ASCII email address is replaced with the mapped ASCII email address and the email message is sent to the selected recipient.

22 Claims, 2 Drawing Sheets

TRANSMITTING MESSAGES BETWEEN INTERNATIONALIZED EMAIL SYSTEMS AND NON-INTERNATIONALIZED EMAIL SYSTEMS

The present invention relates generally to electronic mail (email) servers and specifically to electronic mail servers configured to handle non-ASCII email addresses.

BACKGROUND

With the growth of computer networks, electronic mail (email) has become a popular means for both personal and professional communication. Due, in large part, to the proliferation of the Internet, email has become a standard means of communication for billions of people.

A sender uses a Mail User Agent (MUA) to create an email message. Examples of MUAs include client-side applications such as Microsoft Outlook and Mozilla Thunderbird as well as web-based applications such as Hotmail and Gmail. As is well known, the sender creates the email message by entering one or more email addresses, a message subject, a message body and may also attach files to the message. Each email address comprises two portions. A first portion is referred to as a domain of the email address and references a host name or domain name. The domain is typically located to the right of the '@' sign. A second portion is referred to as a username or account name and is used to identify an email account at the domain. The username is typically located to the left of the '@' sign.

The MUA transmits the email message to the recipient, or recipients, via a transmission email server. The transmission email server includes a Mail Submission Agent (MSA) and a Mail Transport Agent (MTA). The MTA contacts a Domain Name System (DNS) to resolve the domain name of the email address and obtain a corresponding Internet Protocol (IP) address. The MTA server uses the obtained IP address to transmit the message to a receiving email server for the recipient. The email message maybe transmitted directly to the receiving email server or it may be relayed via a plurality of Mail Transport Agents (MTAs).

The receiving email server typically includes a MTA, a local delivery agent, local file storage, and a Post Office Protocol (POP) and/or Internet Message Access Protocol (IMAP) server to allow email message retrieval. The recipient uses a MUA to retrieve the email message from the receiving email server.

In a typical American Standard Code for Information Interchange (ASCII) environment all of the components in the network are capable of processing an ASCII email address. However, email addresses in the near future may contain internationalized (non-ASCII) characters. For example, Internationalized Domain Names (IDNs) are defined as Internet domain names that can potentially include non-ASCII characters. It is envisaged that international email addresses may also include internationalized usernames as part of such an email address. Therefore, it is possible that the internationalized usernames may also include non-ASCII characters.

In order to overcome this limitation, a method has been proposed that allows email system components to "downgrade" an internationalized email address. Specifically, an alternate, ASCII email address is defined by a user for an internationalized email addresses. Accordingly, when an ASCII-only system component is encountered, an internationalized email address is downgraded by replacing it with the alternate, ASCII email address before delivering the email to the ASCII-only system component.

This solution enables email messages having internationalized email addresses to be delivered using existing network components.

Accordingly, it is desirable to facilitate the delivery of email messages having internationalized email addresses across a network that may include one or more components that are compatible only with ASCII email addresses without the limitations of the prior art.

SUMMARY

In accordance with an aspect of the present invention there is provided a computer-implemented method for transmitting an email message from a sender to a selected recipient, the selected recipient capable of receiving only email messages compliant with American Standard Code for Information Interchange (ASCII), and one or more of the sender or other recipients having a non-ASCII email address, the method comprising the steps of: creating mapped ASCII email addresses for each of the non-ASCII email addresses by: generating a username as a mapping of the non-ASCII email address using a predefined mapping algorithm; selecting a domain name from one or more predefined domain names, each of the domain names configured to resolve to a predefined gateway server; and concatenating the username and the domain name to create the mapped ASCII email address; replacing the non-ASCII email addresses with the corresponding mapped ASCII email address; downgrading a remainder of the email message, if necessary, using a predefined protocol; and transmitting the email message to selected recipient.

In accordance with another aspect of the present invention there is provided a gateway server configured to implement the method described above. Further, there is provided a computer readable medium having stored thereon instructions for performing the method described above.

BRIEF DESCRIPTION OF THE DRAWINGS

An embodiment of the present invention will now be described by way of example only with reference to the following drawings in which.

DETAILED DESCRIPTION OF THE PREFERRED EMBODIMENT

Figure 1:
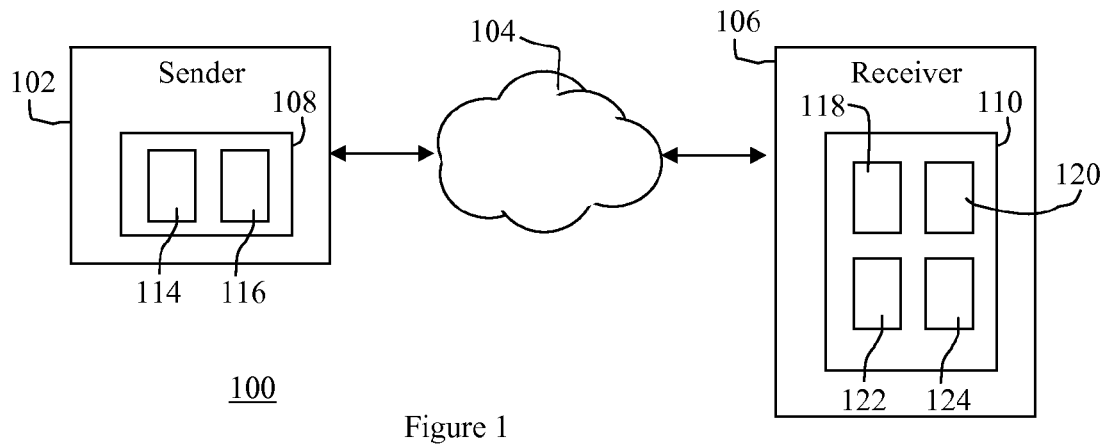
FIG. 1 is a block diagram of a standard network infrastructure (prior art)

For convenience, like numerals in the description refer to like structures in the drawings. Referring to FIG. 1, a block diagram illustrating a standard network infrastructure is illustrated generally by numeral 100. The network 100 includes a sender 102, a communication network 104, and a recipient 106. For ease of explanation, the sender 102 includes a transmission email server 108 and the recipient 106 includes a reception email server 110. The communication network 104 includes a plurality of network components required to facilitate communication between the transmission email server 108 and the reception email server 110, as is known in the art.

The sender 102 is a computing device capable of transmitting an email message, such as a personal computer, a notebook computer, a smart phone, a tablet, or a personal digital assistant for example. The sender 102 provides its user with access a Mail User Agent (MUA). The transmission email server 108 includes a Mail Submission Agent (MSA) 114 and an MTA 116.

As is known in the art, the transmission email server 108 may be local to the sender 102, connected with the sender 102 via a local network (not shown), or hosted at a remote site and connected with the sender 102 via the communication network 104.

Similar to the sender 102, the recipient 106 is a computing device capable of receiving an email message, such as a personal computer, a notebook computer, a smart phone, a tablet, or a personal digital assistant (PDA) for example. The recipient 106 provides its user with access a MUA. The reception email server 110 includes a MTA 118, a local delivery agent 120, local file storage 122 and a message retrieval server 124.

As is known in the art, the reception email server 110 may be local to the recipient 106, connected with the recipient 106 via a local network (not shown), or hosted at a remote site and connected with the recipient 106 via the communication network 104.

The MTA 118 is configured to receive an email message from the transmission email server 108 either directly, or indirectly via a plurality of intermediate MTAs 118. The local delivery agent 120 is configured to persist the received email message on the local storage 122 in a directory corresponding with the username. The message retrieval server 124 comprises one or more of a POP server, an IMAP server or a local host server, and is configured to deliver email messages from the local storage 108 to the recipient 106 for display via the MUA.

Figure 2:
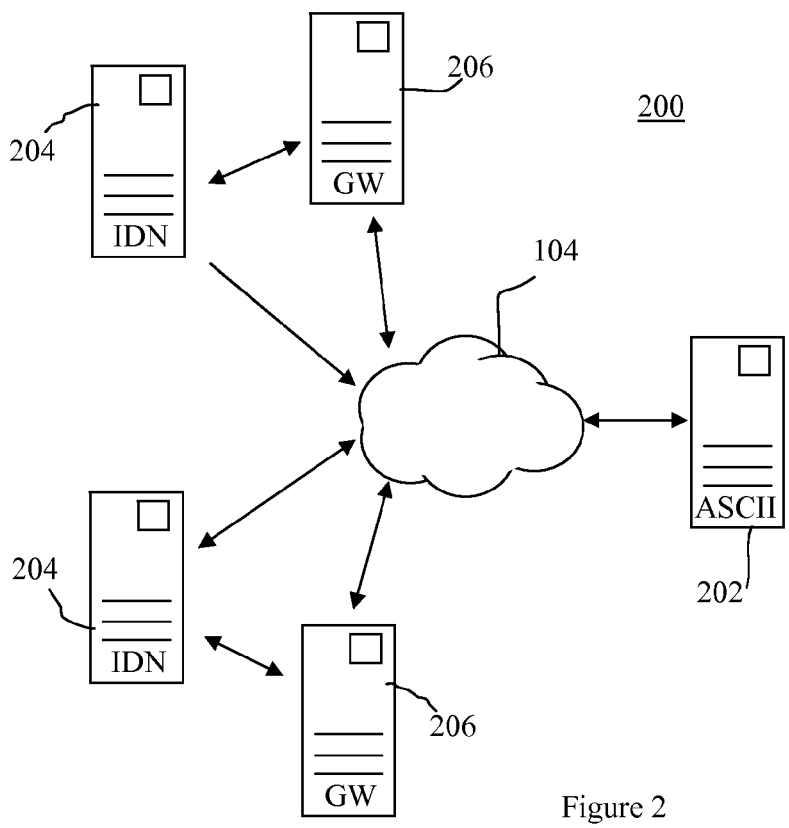
FIG. 2 is a block diagram of the network infrastructure of an embodiment of the present invention.

In accordance the present embodiment, one or more gateway servers are configured as an intermediary between an internationalized email server capable of handling internationalized email addresses and a traditional email server incapable of handling internationalized email addresses. Referring to FIG. 2, an email network in accordance with the present embodiment is illustrated generally by numeral 200. The email network 200 includes a traditional email server 202, two internationalized email servers 204, two gateway servers 206 and the communication network 104.

It will be appreciated by a person of ordinary skill in the art that the number of servers are described for ease of explanation only and the email network 200 can be configured generally for one or more traditional email servers 202, one or more internationalized email servers 204 and one or more gateway servers 206.

The internationalized email servers 204 and the traditional email servers 202 may include an MUA, a MSA 114, and/or a MTA 118. Further, the internationalized email servers 204 and the traditional email servers 202 are configured to communicate similarly to transmission email server 108 and reception email server 110 described with reference to FIG. 1.

However, in the present embodiment, email messages are routed via the gateway server 206. That is, the gateway server 206 is configured to downgrade email messages received from one of the internationalized email servers 204 to a standard format that the traditional email server 202 can receive. Further, the gateway server 206 is configured to "upgrade" any return message received from the traditional email server 202 to an internationalized format for the internationalized email servers 204 to receive. The gateway servers 206 may be configured to communicate directly with corresponding internationalized email servers or indirectly via the communication network 104.

In the present embodiment, the gateway servers 206 function as an intermediate MTA 118. Thus, the gateway servers 206 have one or more associated gateway domains and an MX record configured in a DNS registry to provide the IP address of the gateway server 206 so that other MTAs 118 can make a connection thereto. Accordingly, each of the internationalized email servers 204 is configured to forward email messages to a corresponding gateway server 206.

In a first example, each gateway server 206 is associated with an organization and is therefore associated with a corresponding one of the internationalized email servers 204. Thus, each internationalized email server 204 is configured to forward email messages to a different gateway server 206.

In a second example, the gateway server 206 is operated as a shared server and is therefore associated with a corresponding plurality of internationalized email servers 204. Thus, the plurality of internationalized email servers 204 are configured to forward email messages to the same gateway server 406. This example affords a third party the ability to provide gateway services to its customers.

It will be appreciated by a person of ordinary skill in the art that a hybrid of the first example and the second example could be implemented.

Note that the traditional email server 202 need not be configured to use one of the gateway servers 206 since it cannot send email messages with non-ASCII addresses that need to be downgraded. However, when the traditional email server 202 receives an email message from the gateway server 206, any internationalized email address will have been downgraded to an ASCII email address. The downgraded ASCII email address includes a username comprising a unique identifier and a domain associated with the gateway server 206, as will be described in detail. Accordingly, the traditional email server 202 can send replies to the internationalized email servers 204 via the gateway server 206 using standard DNS lookup. The gateway server 206 can then forward the replies to the internationalized email servers 204 by mapping the unique identifier to a corresponding internationalized email address.

In order to promote backwards compatibility, the gateway server 206 is capable of handling all possible email message between the internationalized email servers 204 and the traditional email servers 202. Accordingly, the gateway server 206 delivers email to all recipients specified by the sender. The gateway server 206 also delivers replies back to the sender. Simple Mail Transfer Protocol (SMTP) reliable mail transport requires that all recipients be able to reply to all email messages and to all subsequent replies.

The fundamental incompatibility between the internationalized email servers 204 and the traditional email servers 202 occurs when an email message includes senders and/or recipients that are a mix of ASCII only email addresses and internationalized email addresses.

Figure 3:
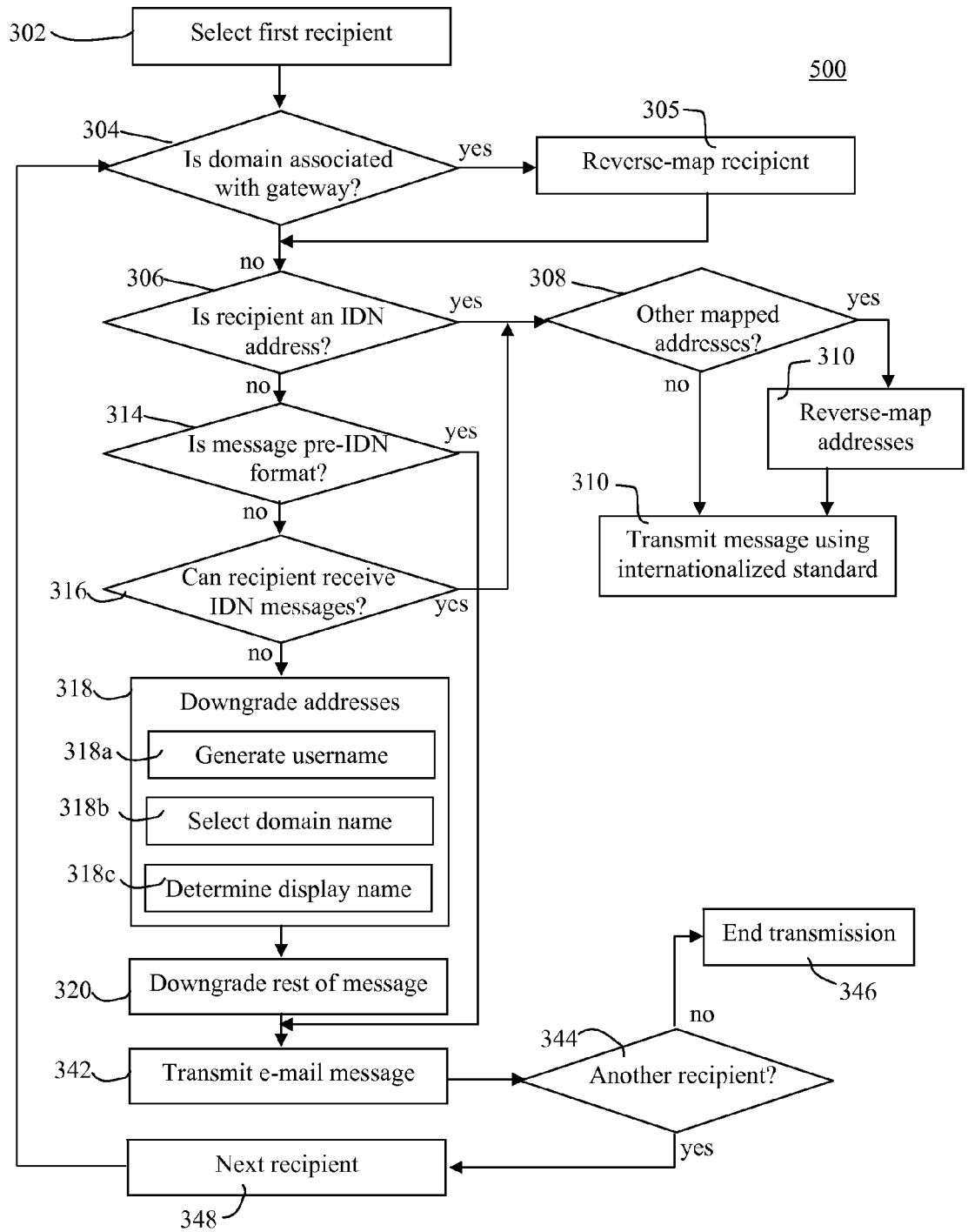
FIG. 3 is a flow chart illustrating transmission of an email message from a non-ASCII email address when one or more mail delivery elements cannot process non-ASCII.

Therefore, routing software is provided on the gateway server 206 that facilitates communication between the internationalized email servers 204 and the traditional email servers 202. Referring to FIG. 3, a flow chart illustrating the operation of the routing software implemented at the gateway server 206 is shown generally by numeral 300. At step 302, the gateway server 206 receives an email message to be transmitted to one or more recipients and selects a first recipient. At step 304, the gateway server 206 determines whether or not a domain of the selected recipient is associated with the gateway server 206.

If the domain is associated with the gateway server 206, the routing software continues at step 305. An email address having a domain associated with the gateway server 206 is a result of a previously mapped original email address. Accordingly, at step 305, the recipient's original email address is retrieved by reverse-mapping the email address and the routing software continues at step 306. For ease of explanation, details of the mapping and reverse-mapping are provided after the description of the operation of the routing software.

If the domain is not associated with the gateway server 206, the routing software continues at step 306. At step 306, the routing software determines if the recipient is an internationalized email address. If the recipient is an internationalized email address then the routing software continues at step 308. At step 308, it is determined whether or not the email message includes other recipients that have email addresses having a domain associated with the gateway server 206.

If there are no other email addresses that have a domain associated with the gateway server 206 then at step 312, the email message is transmitted to the recipient using the internationalized standard. If there are other email addresses that have a domain associated with the gateway server 206 then at step 310, the email addresses are reverse-mapped to retrieve their original email addresses. Once the original email addresses have been retrieved, then at step 312, the email message is transmitted to the recipient.

Returning to step 306, if the recipient is not an internationalized email address then the routing software continues at step 314. At this point it is known that the recipient is an ASCII email address since it is not an internationalized email address. Accordingly, at step 314, it is determined if the sender has an ASCII email address and if the email message conforms with the pre-internationalized standard. There may be more than one way to determine if the email message conforms with the pre-internationalized standard. For example, when the email message was sent to the gateway server 206, the SMTP MAIL FROM command may indicate it is an Internationalized message. As another example, the email message can be scanned to determine if it contains any non-ASCII characters that are not allowed according to pre-Internationalized email standards, including other recipients copied on the email message.

If both criteria are met, the routing software continues at step 342 and the message is transmitted using the pre-internationalized standard. If one, or both, criteria are not met, the routing software continues at step 316.

At step 316 it is determined whether or not the recipient can receive internationalized email messages. That is, the email address itself may not be sufficient to determine whether or not a recipient can receive internationalized email messages. For example, people who have ASCII email address may not change them even when they transition from the traditional email server 202 to the internationalized email server 204. Further, people will likely continue to create new ASCII email addresses even when using the internationalized email server 204.

There are a number of different ways to determine whether the recipient can receive internationalized email messages. For example, the destination of the recipient can be determined from a standard DNS lookup of an MX record for the domain of the selected recipient. The gateway server 206 makes an SMTP connection to a corresponding MTA server and issues the SMTP EHLO command. If a reply from the corresponding MTA server includes a predefined flag that indicates it supports internationalized addresses in its list of capabilities, then the MTA 118 associated with the selected recipient is an internationalized server, as per EAI draft standard "SMTP Extension for Internationalized Email Address", draft-ietf-eai-rfc5336bis, http://tools.ietf.org/wg/eai/. In another example, parameters could be established in configuration information for destination domains or individual email addresses to assist in determining whether or not the recipient can receive internationalized email messages. Other methods may be developed without departing from the scope of the present invention.

If it is determined that the selected recipient can receive internationalized email messages, the routing software continues at step 308. If it is determined that the recipient cannot receive internationalized email messages, the routing software continues at step 318.

At step 318, the routing software downgrades all internationalized email addresses in the email headers. This may include the sender as well as any recipients in the From, To, Cc and any other standard email headers. For each internationalized email address, an ASCII email address is determined as follows.

The general form of presenting an email address is to present a display name, which is optional, followed by the email address in angle brackets. A corresponding mapped ASCII email address is obtained in several steps. In a first step 318a, an ASCII username is generated from the internationalized email address using a predefined mapping algorithm. In a second step 318b, an ASCII domain is selected from a plurality of predefined domains. The generated ASCII username and the selected ASCII domain name are concatenated to form the mapped ASCII email address. In a third 318c, optional step, a display name is determined.

Once all of the internationalized email addresses have been downgraded then, at step 320, the routing software downgrades other parts of the email message, if necessary. Examples of other parts include the subject line or MIME body part header fields. The other parts of the email message can be downgraded a number of different ways. In the present embodiment the other parts of the email message are downgraded in accordance with a developing standard "Post-delivery Message Downgrading for Internationalized Email Messages", draft-ietf-eai-popimap-downgrade-00.txt, which can be found at http://tools.ietf.org/wg/eai/draft-ietf-eai-popimap-downgrade/.

At step 342, the email message is transmitted to the selected recipient. At step 344 the routing software determines if there is another recipient to whom to send the email message. If there is no other recipient, then the email message transmission is complete, from the perspective of the gateway server 206 and at step 346 the email message transmission ends. If there is another recipient, then, at step 348, a subsequent recipient becomes the selected recipient and the routing software continues at step 304.

Accordingly, it will be appreciated that the routing software executing on the gateway server 206 facilitates transmitting an email message from a sender using an internationalized email server 204 to a plurality of recipients including at least one of which is using a traditional email server 202 in a manner that is transparent to both the sender and the recipient. The routing software transmits the email message to recipients using internationalized email servers 204 without modification. The routing software downgrades and transmits the email message to recipients using traditional email servers 202. Additionally, the routing software handles return messages from the recipients.

Details of the mapping are described as follows. For example, consider the internationalized email address Ερνιε Δαινος <Ε.Δδαινος@αφιλιας.info>. At step 318a, in order to generate the ASCII username, the internationalized email address is mapped to ASCII using a predetermined mapping algorithm. The mapping algorithm can be one of a number of known or proprietary mapping algorithms, as will be appreciated by a person of ordinary skill in the art. In the present embodiment, the mapping algorithm has the following properties. The mapping algorithm can encode any arbitrary input string of UTF8 characters into an ASCII string that represents a valid ASCII email username. The encoded ASCII string cannot be obtained from a different string of UTF8 characters. A reverse mapping, or decoding, algorithm exits such that when it is applied to the encoded ASCII string, the original input string of UTF8 characters is obtained. Further, it is desirable for the mapping algorithm to be case insensitive, so that if any process or human entry changes the case of any characters of the encoded ASCII string in a reply message, the original string of UTF8 characters can still be obtained.

One example of such an algorithm is to represent each byte of the UTF8 string as a two character sequence of the hexadecimal value of the byte. Thus for example, the email address E.Δδαινος@αφιλιας.info has a hexadecimal encode of ce952ece94ceb4ceb1ceb9cebdcebfcf8240ceb1cf86ceb9 cebbceb9ceb1cf822e696e666f0d0a.

Another example of such an algorithm is Base64 encoding. This encoding method may be preferred to hexadecimal encoding in some implementation as it produces a more compact encoding and is already used in email standards, such as "Multipurpose Internet Mail Extensions(MIME) Part One: Format of Internet Message Bodies", http://tools.ietf.org/html/rfc2045. The Base64 encoding of the internationalized email address E.Δδαι voς@αφιλιας.info is zpUuzpTOtM6xzrnOvc6/z4JAzr HPhs65zrv Ouc6xz4IuaW5mbw==

Yet another example of such an algorithm is Base32 encoding. Base32 encoding may be preferred to Base64 encoding because it is case insensitive. The Base32 encoding of internationalized email address E.Δδαινος@αφιλιας.info, using lower case instead uppercase letters in the encoding, is z2ks5tuuz22m5mooxhhl3tv7z6bebtvrz6dm5oooxphlttvrz 6bc42lomzxq.

To support possible future changes to the mapping algorithm, an algorithm identifier is added as the first byte of the encoded ASCII string. The algorithm identifier is used to indicate which if a plurality of possible mapping algorithms was used to encode the encoded ASCII string. The algorithm identifier is a valid email character that is distinct from the algorithm identifiers used to define other encoding algorithms. As such, the algorithm identifiers can be arbitrarily selected and pre-assigned to specific encoding algorithms for continuity across multiple gateway servers 206.

In the present embodiment, byte '*' is selected as the algorithm identifier to represent Base32 encoding, so the username becomes *z2ks5tuuz22m5mooxhhl3tv7 z6bebtvrz6dm5oooxphlttvrz 6bc42lomzxq.

At step 318b, in order to provide a domain for the mapped ASCII email address, the gateway server selects a domain from a predefined list of available gateway domains. Each of the plurality of gateway domains on the predefined list is associated with gateway server 206 at the DNS registry.

As previously discussed, the gateway server 206 may serve a single internationalized email server 204 or a plurality of internationalized email servers 204. Each internationalized email server 204 uses one or more email domains. If the gateway server 206 serves a single internationalized email server 204 that uses only one email domain, then only one gateway domain is used. For example, if a gateway domain of gateway.afilias.info is used as the domain, the email address becomes:

*z2ks5tuuz22m5mooxhhl3tv7z6bebtvrz6dm
5oooxphlttvrz6bc42lomzxq@gateway.afilias.info If however, the gateway server 206 serves a single internationalized email server 204 that uses more than one email domain or the gateway server 206 serves a plurality of internationalized email servers 204 that uses one or more email domains, the gateway domain is selected from a list of possible gateway domains. Each gateway domain in the list is associated with a corresponding one of email domains and, thereby, the corresponding internationalized email server 204. Continuing the example above, the gateway server 206 could have registered the following domains: gateway.afilias.info; gw.athens.com; and gw.afilias.info. Each of these domains is associated with a corresponding email domain: αφιλιας.info; ατηενς.γρ; and a default, respectively. This information is stored at the gateway server 406 in a domain configuration table as illustrated in Table 1.

TABLE 1

| Email Domain | Gateway Domain | Display Name Comment |
|---|---|---|
| αφιλιας.info | gateway.afilias.info | Mapped from Internationalized address |
| ατηενς.γρ | gw.athens.com | Μαππεδ φρομ αδδρεσσ |
| default | gw.afilias.info | Mapped from address |

Thus, if the internationalized email address includes an email domain that is served by the gateway server 206, the domain of the mapped ASCII email address is the associated gateway domain. For example, if the email domain is αφιλ-ιας.info, the domain of the mapped ASCII email address is the gateway domain gateway.afilias.info. Similarly, if the email domain is ατηενς.γρ, the domain of the mapped ASCII email address is the gateway domain gw.athens.com. If the email domain is not served by the gateway server 206, the domain of the mapped ASCII email address is the default domain gw.afilias.info.

At step 318c, the display name is determined. In the present embodiment, the display name for the email address is generated by concatenating an original display name, a descriptive comment and the internationalized email address. The descriptive comment is a predefined comment associated with the email domain and gateway domain in the domain configuration table.

Since non-ASCII characters are not allowed in headers in the ASCII email message, the gateway server 206 MIME-encodes the original display name when transmitting the email message as per RFC 2047, "MIME (Multipurpose Internet Mail Extensions) Part Three: Message Header Extensions for Non-ASCII Text", http://tools.ietf.org/html/rfc2047.

Accordingly, the display names provides the recipient with full identification information of the internationalized email addresses since the downgraded email address will likely be unrecognizable to the recipient. Accordingly, continuing the previous example, the final, downgraded ASCII email address is:

"Ερνιε Δαινος Mapped from Internationalized address E.Δδαινος@αφιλιας.info"
<*z2ks5tuuz22m5mooxhhl3tv7z6bebtvrz6dm5ooox phlttvrz6bc42lomzxq@gateway.afilias.info>

The present embodiment describes providing a gateway domain for each email domain. However, since the entire internationalized email address is encoded in the username of the downgraded email address, it would be sufficient to provide a single gateway domain for all email domains. However, providing a gateway domain for each email domain affords flexibility and customization, as exemplified with regard to the descriptive comments. Further, since the gateway domain is seen by the recipient, it may be used to reflect from where the email originated. For example, a corporation may use a gateway domain of china.afilias.com for email addresses downgraded from a Chinese subsidiary and europe.afilias.com for email addresses downgraded from a European subsidiary.

As previously mentioned, many users may continue to use ASCII email addresses even after their email servers have been upgraded to the internationalized email servers 204. Although the routing software does not need to map ASCII email addresses when downgrading a message, if it does not do so then replies to the email message may arrive at internationalized email servers 204 with a mapped gateway server email addresses instead of the original internationalized email addresses. This may be undesirable.

Accordingly, in an alternate embodiment, the routing software further downgrades all ASCII email addresses that do not have a domain associated with the gateway server 206 to mapped ASCII email addresses having domains associated with the gateway server 206. In yet an alternate embodiment, the routing software downgrades all ASCII email addresses that are associated with an internationalized email server to mapped ASCII email addresses having domains associated with the gateway server 206.

An example of the ASCII mapping algorithm is described using the sample email address Ernie Dainow <edainow@afilias.info> and the algorithm identifier for an ASCII mapping algorithm is the '#' symbol. At step 318a, the mapped ASCII username is generated. The last '@' symbol in the email address, which will be the '@' symbol before the domain name, is replaced with the algorithm identifier '#'. Further, the algorithm identifier '#' is added in front of the email address so the email username becomes #edainow#afilias.info.

At step 318b, in order to provide a domain for the mapped ASCII email address, the gateway server 206 selects a domain from a predefined list of available gateway domains. In the present example, the domain afilias.info is mapped to the domain gway.afilias.info. Accordingly, the '@' symbol and the gateway domain name is added to the username and the email address becomes: #edainow#afilias.info@gway.afilias.info At step 318c, the display name is determined. As previously described, the display name for the email address is generated by concatenating an original display name, a descriptive comment and the internationalized email address. In the present example, the descriptive comment is "mapped from". Accordingly, the final, downgraded ASCII email address is:

"Ernie Dainow mapped from edainow@afilias.info" <#edainow#afilias.info@gway.afilias.info>

Accordingly, the mapped ASCII email addresses directs all replies to return via the gateway server 206 where all mapped email addresses in the email message, both ASCII and non-ASCII, can be restored to the original addresses.

Details of the reverse mapping is described as follows. In order to recover an original internationalized email address, the gateway server 206 extracts the username from the email address. Assuming, for example, the email address is the internationalized email address from the previous example, E.Δδαινoς@αφιλιας.info, the extracted username is:
*z2ks5tuuz22m5mooxhhl3tv7z6bebtvrz6dm5oooxphlt trz6bc42lomzxq The algorithm identifier is removed from the username and analysed to determine the original mapping algorithm used. In the present example, the '*' indicates that Base32 encoding was used as the mapping algorithm. Accordingly, a reverse mapping is achieved by applying standard Base32 decoding and the internationalized email address E.Δδαινoς@αφιλιας.info is recovered.

The display name is amended by removing the comment and the internationalized domain, previously added thereto, and the complete internationalized email address is recovered as:
Eρνιε Δαινoς <E.Δδαινoς@αφιλιας.info>

In order to recover an original ASCII email address, the gateway server 206 extracts the username from the email address. Assuming, for example, the email address is the ASCII email address from the previous example, edainow@afilias.info, the extracted username is: #edainow#afilias.info The algorithm identifier is removed from the username and analysed to determine the original mapping algorithm used. In the present example, the '#' symbol indicates that ASCII encoding was used as the mapping algorithm. Accordingly, a reverse mapping is achieve by replacing the last '#' symbol with an '@' symbol and the original ASCII email address is recovered as edainow@afilias.info.

The display name is amended by removing the comment and the ASCII email address, previously added thereto and the original email address is recovered as "Ernie Dainow"<edainow@afilias.info>

For ease of understanding, three cases will now be described illustrating the implementation of the routing software. In the first case, a first user with an internationalized email address (user1@I1) transmits an email message to a second user with an internationalized email address (user2@I2) and a third user with an ASCII-only email address (user3@A1). The first and second users each include an internationalized email server 204 and the third user includes a traditional email server 202. The email message headers are represented as:
From: user1@I1
To: user2@I2
Cc: user3@A1

Accordingly, the first user transmits the email message to its associated first gateway server 206. The routing software receives the email message and selects the second user as the selected recipient. Since the second user comprises an internationalized email address the email message is forwarded to the second user. Accordingly, the email message headers as received by the second user are represented as:
From: user1@I1
To: user2@I2
Cc: user3@A1

It is determined that there is another user, and the third user is selected as the selected recipient. Further, it is determined that the third user comprises an ASCII-only email address and that the email server for the third user is the traditional email server 202. Accordingly, the internationalized email addresses of both the first user and the second user are downgraded. Specifically, the internationalized email address of the first user is downgraded to a first mapped ASCII email address <mapped(user1@I1)> and the internationalized email address of the second user is downgraded to a second mapped ASCII email address <mapped(user2@I2)>. Both the first and second mapped ASCII email address are on a gateway domain represented by gw1.domain and can be resolved to the first gateway server 206 using traditional DNS resolution. The full mapped email addresses are <mapped(user1@I1)@gw1.domain> and <mapped(user2@I2)@gw1.domain>. The email message is sent to the third user. Accordingly, the email message headers as received by the third user is represented as:

From: mapped(user1@I1)@gw1.domain
To: mapped(user2@I2)@gw1.domain
Cc: user3@A1

No other recipients are provided for the email message, so the operation is complete and the email message has been transmitted.

In the second case, the second user performs a reply all. As a result, the email message headers are represented as:

From: user2@I2
To: user1@I1
Cc: user3@A1

Accordingly, the second user transmits the email message to its associated second gateway server 206. The second gateway server 206 may or may not be the same as the first gateway server 206. The routing software receives the email message and selects the first user as the selected recipient. Since the first user comprises an internationalized email address the email message is forwarded to the first user. Accordingly, the email message headers as received by the first user is represented as:

From: user2@I2
To: user1@I1
Cc: user3@A1

It is determined that there is another user, and the third user is selected as the selected recipient. Further, it is determined that the third user comprises an ASCII-only email address and that the email server for the third user is the traditional email server 202. The internationalized email addresses of both the first user and the second user are downgraded. A domain registered to the second gateway is represented by gw2.domain. Specifically, the internationalized email address of the first user is downgraded to a third mapped ASCII email address <mapped2(user1@I1)@gw2.domain> and the internationalized email address of the second user is downgraded to a fourth mapped ASCII email address <mapped2(user2@I2)@gw2.domain>. Both the third and fourth mapped ASCII email address can be resolved to the second gateway server 206 using traditional DNS resolution. The email message is then sent to the third user. Accordingly, the email message headers as received by the third user is represented as:

From: mapped2(user1@I1)@gw2.domain
To: mapped2(user2@I2)@gw2.domain
Cc: user3@A1

It is then determined that there are no other users, the operation is complete and the email message has been transmitted.

In the third case, the third user replies to both the first user and the second user, in response to the email message received in the first case. The email message headers are represented as:

From: user3@A1
To: mapped(user1@I1)@gw1.domain
Cc: mapped(user2@I2)@gw1.domain

The third user is not associated with the gateway server 206. As previously discussed, since the third includes the traditional email server 202 it will only transmit email messages to ASCII email addresses. Accordingly, the traditional email server 402 uses standard email transmission protocol to deliver the email message to the first and second mapped ASCII email addresses.

For the first mapped email address, the email message is delivered to the first gateway server 206, as determined by standard domain name resolution, since the domain of the first mapped email address is associated with the first gateway server 206 at the DNS registry.

The email message is received by the first gateway server 206. The routing software determines that the first mapped ASCII email address is associated with the first gateway server 206 and recovers the internationalized email addresses for the first and second mapped ASCII email addresses. The routing software then transmits the email message to the first user. Accordingly, the email message headers as received by the first user is represented as:

From: user3@A1
To: user1@I1
Cc: user2@I1

For the second mapped email address, the email message is delivered to the first gateway server 206, as determined by standard domain name resolution, since the domain of the second mapped ASCII email address is associated with the first gateway server 206 at the DNS registry.

The email message is received by the first gateway server 206. The routing software determines that the second mapped ASCII email address is associated with the first gateway server 206 and recovers the internationalized email addresses for the first and second mapped ASCII email addresses. The routing software then transmits the email message to the second user. Accordingly, the email message headers as received by the second user is represented as:

From: user3@A1
To: user1@I1
Cc: user2@I1

If the third user would have responded to the second user (for the message described in the second case), rather than the first user, the transmission would have been similar to that described above. However, the email message would have been transmitted to the second gateway server 206 rather than the first gateway server 206 and the email message headers as received by both the first user and the second user would have been represented as:

From: user3@A1
To: user1@I1
Cc: user2@I1

Accordingly, it will be appreciated that the present invention facilitates email transmission between the internationalized email servers 404 and the traditional email servers 402 when an email message includes recipients that are a mix of ASCII only email addresses and internationalized email addresses.

The gateway server 206 described above can be implemented as a gateway through which all email messages from the internationalized email servers 204 must pass. Alternately, the gateway server 206 can be implemented "as needed" when it is determined that at least one of the recipients of an email message use a traditional email server 202.

In an alternate embodiment, email users who have an internationalized email address may also have an ASCII email address. In such cases it may be preferable for the gateway server 206 to use the existing ASCII email address which is more readable and meaningful to a recipient than a generated address.

To support this, the gateway server 206 includes an address configuration table. One column of the address configuration table lists internationalized email addresses. A second column of the address configuration table list ASCII email addresses that are associated with corresponding internationalized email addresses. In the present embodiment, the address configuration table is populated by a system administrator.

For example, the internationalized email address "Ερνιε Δαινος <Ε.Δδαινος@αφιλιας.info>" has a corresponding ASCII email address "Ernie Dainow <E.Dainow@afilias.info>", as illustrated in Table 2 below. In the present embodiment, to inhibit a collision between a configured ASCII email address and a mapped ASCII email address, the configuration process restricts the use of the algorithm identifiers, such as the '*' and '#' symbols in the examples described above, in the configured ASCII email addresses. That is, characters used or reserved as algorithm identifiers are precluded from being used for at least the first byte of the configured ASCII email address.

TABLE 2

| Internationalized Address | ASCII Address |
|---|---|
| Eρνιε Δαινο ς <E.Αδαινο ς @αφιλια ς .info> | Ernie Dainow <E.Dainow@afilias.info> |

In order to facilitate this feature, the routing software is modified as follows. In step 318, when all the email addresses in the email headers are mapped, for each email address the address configuration table is parsed to determine if it is present. If the email address is not in the address configuration table, then the routing software downgrades that email address, if necessary, as described above with reference to steps 318*a*, 318*b* and 318*c*. If the email address is present in the address configuration table, the email address in the email header is exchanged for the corresponding ASCII email address in the address configuration table. Depending on the implementation, the routing software may further downgrade the corresponding ASCII email address if it is not associated with the gateway server, as described above.

Further, the routing software is as described with reference to steps 305 and 310 is modified as follows. If the email address is associated with the gateway server 206, the gateway server reverse maps the email address as described above. If the reverse mapped email address is an ASCII email address, the routing software parses the ASCII email address column of the address configuration table. If the ASCII email address is found, the value in the corresponding internationalized address column is used. If the ASCII email address is not found, then the reverse mapped email address is used.

If the ASCII email address is not associated with the gateway server 206, then in the routing software parses the ASCII email address column of the address configuration table. If the ASCII email address is found, the corresponding value in the internationalized address column is used. If the ASCII email address is not found, then the ASCII email as received is used.

In an alternate embodiment, it is possible to store the mapped ASCII email address for the corresponding ASCII email address in the address configuration table once it has been created. Then, at subsequent lookups, the corresponding email address can be bypassed and the mapped ASCII email address can be retrieved directly. In yet an alternate embodiment, the address configuration table can also be used to store to store the mapped ASCII email addresses for non-ASCII email addresses.

As will be apparent to a person of ordinary skill in the art, modifications can be made to the method described herein without detracting from the invention. For example, although the embodiment describes the gateway server 206 as downgrading a remainder of the email message, this function can be performed by a server other than the gateway server 206, such as the internationalized email server 204 or the like. As another example, although the description makes specific reference to DNS for email management, other means of email management such as Lightweight Directory Access Protocol (LDAP) or other known or proprietary method could also be used.

Using the foregoing specification, the invention may be implemented as a machine, process or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "software" and "application" as used herein are intended to encompass a computer program existent (permanently, temporarily, or transitorily) on any computer-usable medium such as on any memory device or in any transmitting device.

Examples of memory devices include, hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processors including, for example, a CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

Although preferred embodiments of the invention have been described herein, it will be understood by those skilled in the art that variations may be made thereto without departing from the spirit of the invention or the scope of the appended claims.

The invention claimed is:

1. A computer-implemented method for transmitting an email message from a sender addressed to both a first recipient and a second recipient, the first recipient capable of receiving email messages having a first email address compliant with American Standard Code for Information Interchange (ASCII) and the second recipient capable of receiving email messages having a second email address compliant with a non-ASCII email address, the email message having a message body, the method comprising the steps of:

identifying the second recipient by the second email address and sending the message body to the non-ASCII email address as a first transmitted email message, the first transmitted email message also including the first email address in an ASCII email address format;

creating a corresponding mapped ASCII email address for the second email address currently in a non-ASCII email address format by:

generating a username as a mapping of the non-ASCII email address format using a predefined mapping algorithm;

selecting a domain name from one or more predefined domain names, each of the domain names configured to resolve to a predefined gateway server; and concatenating the username and the domain name to create the mapped ASCII email address for the second email address;

replacing the second email address in a non-ASCII email address format with the corresponding mapped ASCII email address; and transmitting the message body as a second transmitted email message to the first recipient using the mapped ASCII email address representing the second email address.

2. The method of claim 1 comprising the further steps of:

creating a sender mapped ASCII email address for an email address of the sender currently in the non-ASCII email address format by:

generating a sender username as a mapping of the non-ASCII email address format using the predefined mapping algorithm;

selecting a sender domain name from the one or more predefined domain names; and concatenating the sender username and the sender domain name to create a sender mapped ASCII email address representing the email address of the sender of the non-ASCII email address format;

replacing the email address of the sender of the non-ASCII email address format with the corresponding sender mapped ASCII email address; and transmitting the message body to the second recipient using the sender mapped ASCII email address in the second transmitted email message.

3. The method of claim 1, further comprising the step of downgrading the message body using a predefined protocol to generate a converted message body and replacing the message body with the converted message body before transmitting the second transmitted email message, the first transmitted email message containing the message body as the original message body in unconverted format.

4. The method of claim 1, wherein the username further includes an algorithm identifier for identifying the predefined mapping algorithm used.

5. The method of claim 1, wherein the mapped ASCII email address further comprises a display name for identifying the sender.

6. The method of claim 5, wherein the display name further identifies the corresponding ASCII email address from which it was mapped.

7. The method of claim 5, wherein the display name further identifies the corresponding or non-ASCII email address from which it was mapped, the display name capable of being downgraded along with the message body of the email message.

8. The method of claim 1, further comprising the step of restricting use of an algorithm identifier in the first email address, the algorithm identifier included in the mapped ASCII email address.

9. The method of claim 1 further comprising the steps of, prior to creating the mapped ASCII email address:

determining a corresponding ASCII email address associated with the non-ASCII email address from a predefined table of email addresses; and replacing the non-ASCII email address with the corresponding ASCII email address.

10. The method of claim 1, wherein the predefined mapping algorithm is one of hexadecimal encoding, Base64 encoding or Base32 encoding.

11. The method of claim 1, wherein each of the domain names is configured to resolve to the predefined gateway server using Domain Name System (DNS) or Lightweight Directory Access Protocol (LDAP).

12. A non-transitory computer readable medium having stored thereon instructions which, when executed by a processor, cause the processor to implement the method of claim 1.

13. A gateway server configured to route an email message from a sender addressed to both to a first selected recipient and a second recipient, wherein the second recipient capable of receiving email messages having a second email address served by an internationalized email server and the first recipient capable of receiving email messages having a first email address served by a traditional email server, the email message having a message body, the gateway server comprising:

memory having stored thereon computer-readable instructions; and a processor configured to implement the instructions, the instructions operable to:

identify the second recipient by the second email address and sending the message body to a non-American Standard Code for Information Interchange (ASCII) email address as a first transmitted email message, the first transmitted email message also including the first email address in an ASCII email address format;

create a corresponding mapped ASCII email address for the second email address currently in a non-ASCII email address format by:

generating a username as a mapping of the non-ASCII email address format using a predefined mapping algorithm;

selecting a domain name from one or more predefined domain names, each of the domain names configured to resolve to a predefined gateway server; and concatenating the username and the domain name to create the mapped ASCII email address for the second email address;

replace the second email address in a non-ASCII email address format with the corresponding mapped ASCII email address; and transmit the message body as a second transmitted email message to the first recipient using the mapped ASCII email address representing the second email address.

14. The gateway server of claim 13, the instructions further operable to downgrade the message body using a predefined protocol to generate a converted message body and replacing the message body with the converted message body before transmitting the second transmitted email message, the first transmitted email message containing the message body as the original message body in unconverted format.

15. The gateway server of claim 13 the instructions further operable to:

creating a sender mapped ASCII email address for an email address of the sender currently in the non-ASCII email address format by:

generating a sender username as a mapping of the non-ASCII email address format using the predefined mapping algorithm;

selecting a sender domain name from the one or more predefined domain names; and concatenating the sender username and the sender domain name to create a sender mapped ASCII email address representing the email address of the sender of the non-ASCII email address format;

replacing the email address of the sender of the non-ASCII email address format with the corresponding sender mapped ASCII email address; and transmitting the message body to the second recipient using the sender mapped ASCII email address in the second transmitted email message.

16. The gateway server of claim 13, wherein the username further includes an algorithm identifier for identifying the predefined mapping algorithm used.

17. The gateway server of claim 13, wherein the mapped ASCII email address further comprises a display name for identifying the sender.

18. The gateway server of claim 17, wherein the display name further identifies the corresponding ASCII email address from which it was mapped.

19. The gateway server of claim 17, wherein the display name further identifies the corresponding or non-ASCII email address from which it was mapped, the display name capable of being downgraded along with the message body of the email message.

20. The gateway server of claim 13, further comprising restricting use of an algorithm identifier in the first email address, the algorithm identifier included in the mapped ASCII email address.

21. The gateway server of claim 13, the instructions further operable to, prior to creating the mapped ASCII email address:

determine a corresponding ASCII email address associated with the email address from a predefined address configuration table; and replace the email address with the corresponding ASCII email address.

22. The gateway server of claim 13, wherein each of the domain names is configured to resolve to the predefined gateway server using Domain Name System (DNS) or Lightweight Directory Access Protocol (LDAP).

* * * * *